(12) United States Patent
Lee et al.

(10) Patent No.: US 7,990,457 B2
(45) Date of Patent: *Aug. 2, 2011

(54) MOBILE TERMINAL WITH CAMERA

(75) Inventors: Yong-Hee Lee, Gyeonggi-Do (KR); Joon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 376 days.

This patent is subject to a terminal disclaimer.

(21) Appl. No.: 12/125,462

(22) Filed: May 22, 2008

(65) Prior Publication Data
US 2008/0220833 A1    Sep. 11, 2008

(51) Int. Cl.
H04N 5/222 (2006.01)
H04N 5/225 (2006.01)
H04M 1/00 (2006.01)

(52) U.S. Cl. .................. 348/333.06; 348/373; 348/376; 455/575.3; 455/556.1

(58) Field of Classification Search .................. 348/376, 348/14.01, 14.02, 333.01, 333.06, 373; 455/575.3, 455/556.1
See application file for complete search history.

(56) References Cited

U.S. PATENT DOCUMENTS

| | | |
|---|---|---|
| 5,491,507 A | 2/1996 | Umezawa et al. |
| 5,537,175 A | 7/1996 | Kamaya et al. |
| 6,069,648 A | 5/2000 | Suso et al. |
| 6,466,202 B1 | 10/2002 | Suso et al. |
| 6,549,789 B1 * | 4/2003 | Kfoury ................ 455/575.3 |
| 6,690,417 B1 | 2/2004 | Yoshida et al. |
| 6,965,413 B2 * | 11/2005 | Wada .................... 348/376 |
| 7,076,271 B2 | 7/2006 | Ban et al. |
| 7,084,919 B2 * | 8/2006 | Shibata et al. ........... 348/333.06 |
| 2001/0004269 A1 * | 6/2001 | Shibata et al. ........... 348/333.06 |
| 2001/0038412 A1 | 11/2001 | McNelley et al. |
| 2002/0051060 A1 | 5/2002 | Wada |
| 2003/0064685 A1 * | 4/2003 | Kim ........................ 455/556 |
| 2004/0075620 A1 | 4/2004 | Tanaka et al. |
| 2004/0090552 A1 | 5/2004 | Watanabe et al. |
| 2004/0192220 A1 | 9/2004 | Huang et al. |

FOREIGN PATENT DOCUMENTS

| | | |
|---|---|---|
| JP | 2001-1320463 | 11/2001 |
| JP | 2002-2141977 | 5/2002 |
| JP | 2002-190479 | 7/2002 |
| KR | 2002-0014156 | 2/2002 |
| KR | 2002-0038182 | 5/2002 |
| KR | 2001-0047067 | 6/2003 |
| KR | 2004-0006710 | 1/2004 |

OTHER PUBLICATIONS

Korean Office Action dated Jul. 28, 2004.

* cited by examiner

Primary Examiner — Nhan T Tran
(74) Attorney, Agent, or Firm — KED & Associates, LLP

(57) ABSTRACT

A folding-type mobile terminal is provided with a camera that is capable of accurately imaging an object. This is accomplished by mounting the camera such that a viewing direction of the display of the terminal is substantially parallel to a camera imaging direction.

25 Claims, 9 Drawing Sheets

MOBILE TERMINAL WITH CAMERA

This application claims priority from U.S. patent application Ser. No. 10/624,524, filed Jul. 23, 2003, which claims priority from Korean Application 45057/2002, filed Jul. 30, 2002, the subject matters of which are incorporated herein by reference.

BACKGROUND OF THE INVENTION

1. Field of the Invention

The present invention relates to a mobile terminal with a camera and, more particularly, to a mobile terminal with a camera positioned such that an imaging direction substantially corresponds to the direction that a user looks toward to view the display screen.

2. Background of the Related Art

Currently, mobile terminals, such as cellular phones, are being developed with multimedia functionality, in addition to the standard voice transmission and reception functions. Mobile terminals with color liquid crystals for displaying image information with diverse colors, and cameras for inputting the image information are on the increase.

Mobile terminals with cameras are roughly divided into two types. The first type is an internal camera type mobile terminal in which a camera is fixedly inserted in the terminal. The second type is an external camera type mobile terminal in which a camera is detachably mounted on the terminal.

With the internal camera type mobile terminal, the camera can be mounted at a folder, at a main body of a terminal or at a hinge connection part between the folder and the main body.

If the camera is mounted at the folder, interference occurs between the camera and the LCD mounted at the folder. In addition, spatial restriction arises as the thickness of the folder is increased.

If the camera is mounted at the hinge connection part, interference arises between the hinge connection part and the flexible printed circuit (FPC), and since the camera is rotated around the hinge connection part, it can be easily damaged as its rate of use increases. In order to avoid these problems, the camera is typically mounted at the main body.

FIG. 1 is a front view of an internal camera type mobile terminal with an open folder, in accordance with the related art, and FIG. 2 is a side view of the internal camera type mobile terminal with an open folder, in accordance with the related art.

The internal camera type mobile terminal, in accordance with the related art, includes: a main body 102 having various menu buttons 106 formed at a front surface and a printed circuit board (PCB) (not shown); a folder 104 foldably connected to the main body 102 and having a liquid crystal screen 108 formed at the front surface; a hinge connection part 110 foldably connecting the main body 102 and the folder 104; and a camera module 112 mounted at a rear surface of the main body 102 for photographing a subject.

A microphone 114 is mounted at a lower portion of the main body 102 to transfer a voice signal, and a battery 116 is mounted at a rear surface of the main body 102. The camera module 112 is mounted at the rear surface of the main body 102 so that a subject photographing direction makes a 90 degree angle with respect to the rear surface of the main body 102.

That is, when the folder 104 of the terminal is opened, since the angle between the folder 104 and the main body 102 is maintained at about 150°, the direction (A) that a user looks toward to view the LCD screen 108 of the folder 104 and a photographing direction (B) of the camera module 112 are maintained at an angle of about 30° (θ1).

Thus, with the related art internal camera type mobile terminal, when the user opens the folder and photographs while viewing the LCD screen, if the user looks at the LCD screen straight on, the photographing direction of the camera is inclined downwardly by about 30°, which makes it difficult to accurately photograph a subject and is inconvenient to use.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a folding-type mobile terminal with a handy camera that is capable of accurately photographing an object due to a camera mounting position that lets a direction that a user looks toward to view an LCD screen substantially correspond to a camera photographing direction.

To achieve at least the above objects, in whole or in part, there is provided a mobile terminal with a camera including: a main body; a folder foldably connected to the main body and having liquid crystal display (LCD) screen formed thereon; and a camera module mounted at one side of the main body for imaging a target, wherein the camera module is mounted such that a direction that viewing direction of the LCD screen and an imaging direction of the camera module are substantially parallel.

To achieve at least the above objects, in whole or in part, there is further provided a subscriber unit including: a first portion; a second portion foldably connected to the first portion to allow open and closed configurations; a display on the second portion and a camera mounted on the first portion such that a display viewing direction is substantially parallel to a camera imaging direction.

In one embodiment of the mobile terminal with a camera, in accordance with the present invention, the camera module is mounted at an upper side of a rear surface of the main body at an angle such that a target imaging direction makes an angle of approximately 90° with respect to the rear surface of the folder when the folder is opened.

In one embodiment of the mobile terminal with a camera, in accordance with the present invention, the camera module is mounted such that an angle of approximately 30° is formed between the target imaging direction and the normal to the rear surface of the main body.

In one embodiment of the mobile terminal with a camera, in accordance with the present invention, a protrusion having a predetermined angle is preferably formed at an upper portion of the rear surface of the main body, and has a front surface that is substantially level with the rear surface of the folder when the folder is opened.

In one embodiment of the mobile terminal with a camera, in accordance with the present invention, the protrusion is preferably formed such that its front surface makes an angle of approximately 30° with respect to the rear surface of the main body.

In one embodiment of the mobile terminal with a camera, in accordance with the present invention, the camera module is mounted at the protrusion so that a target imaging direction makes an angle of approximately 90° with respect to the front surface of the protrusion.

In one embodiment of the mobile terminal with a camera, in accordance with the present invention, a reflection mirror is preferably mounted at the front surface of the protrusion in order to reflect an image of the user when the user images himself/herself.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
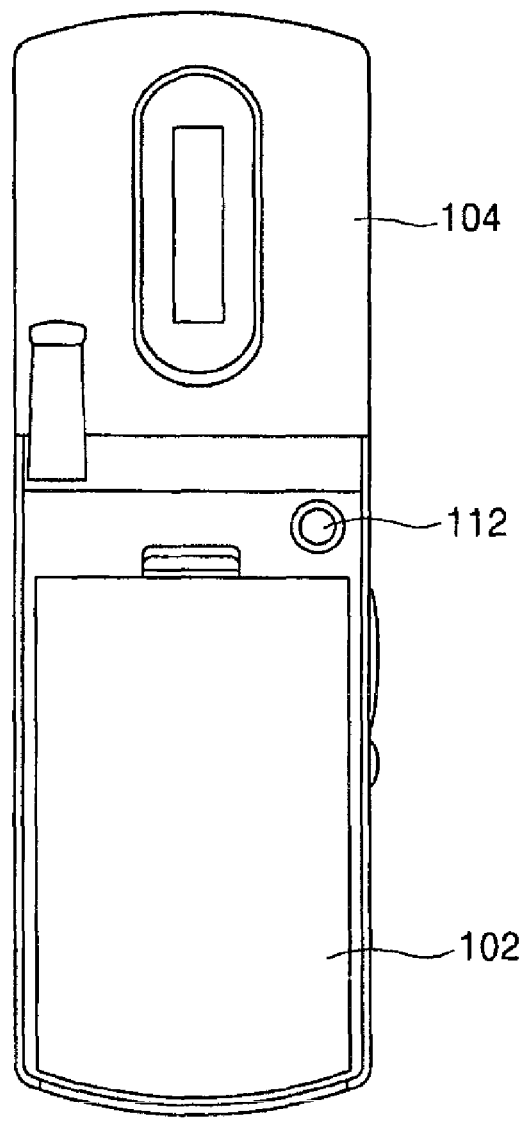
FIG. 1 is a front view of an internal camera type mobile terminal with an open folder, in accordance with the related art.
Figure 2:
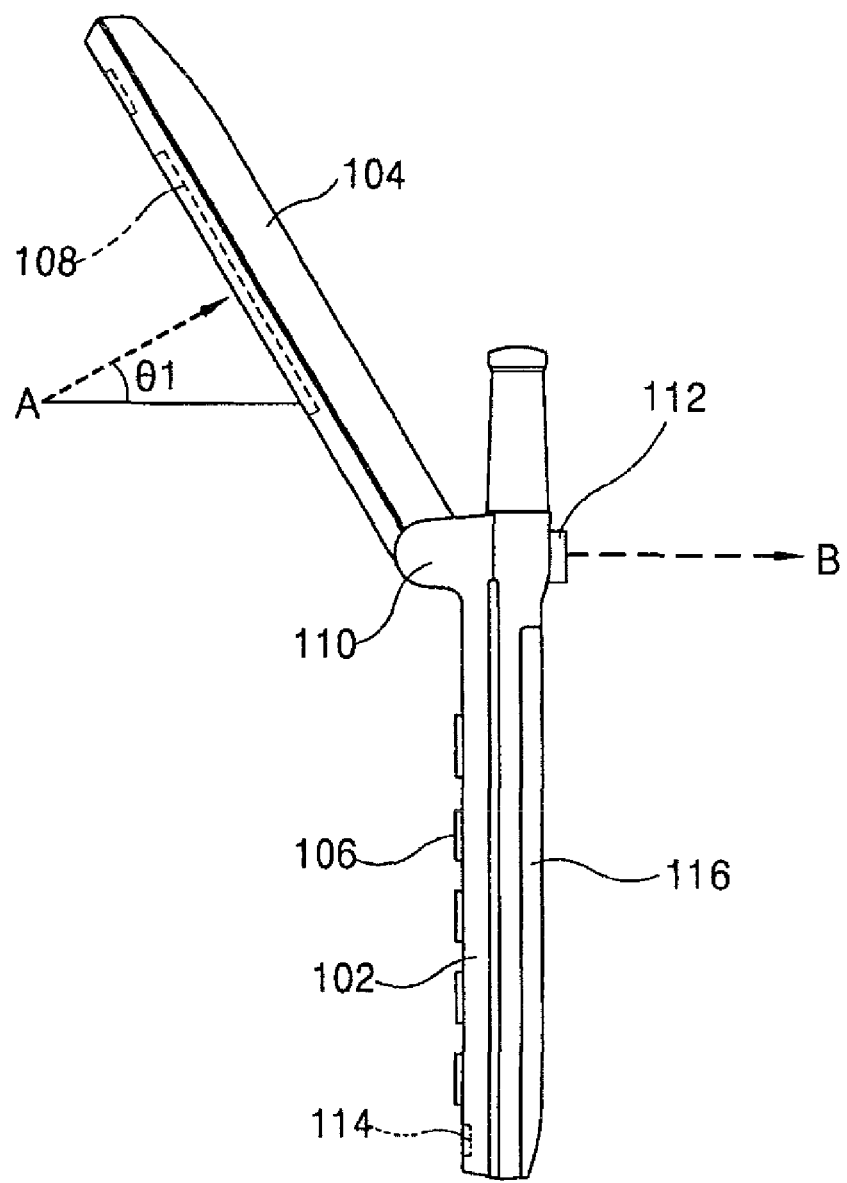
FIG. 2 is a side view of the internal camera type mobile terminal of FIG. 1, in accordance with the related art.
Figure 3:
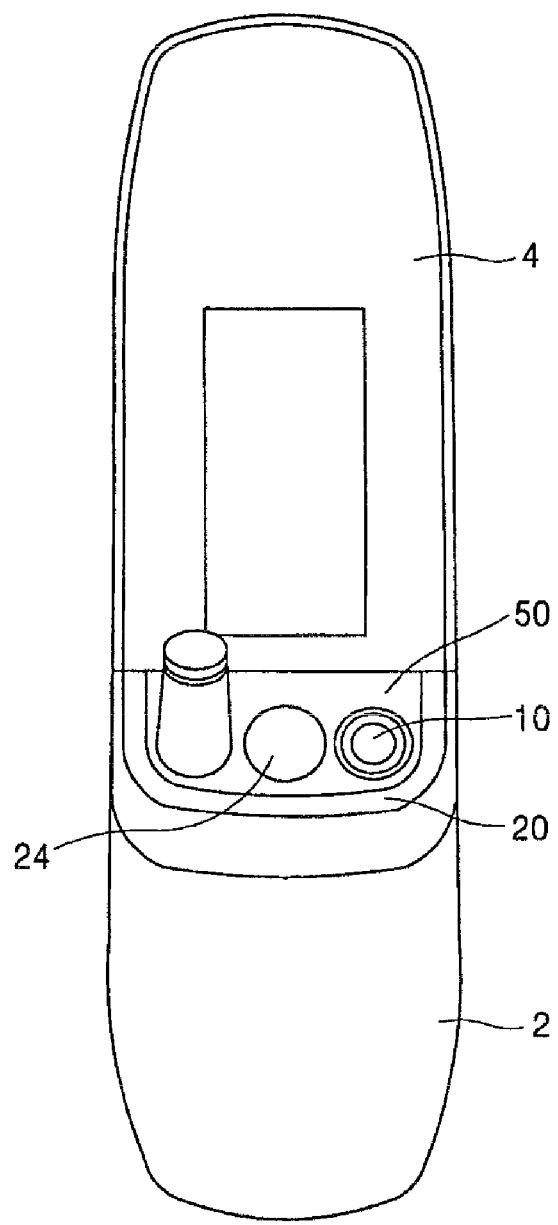
FIG. 3 is a front view of a mobile terminal with a camera, in accordance with one embodiment of the present invention, with a folder in an open state.
Figure 4:
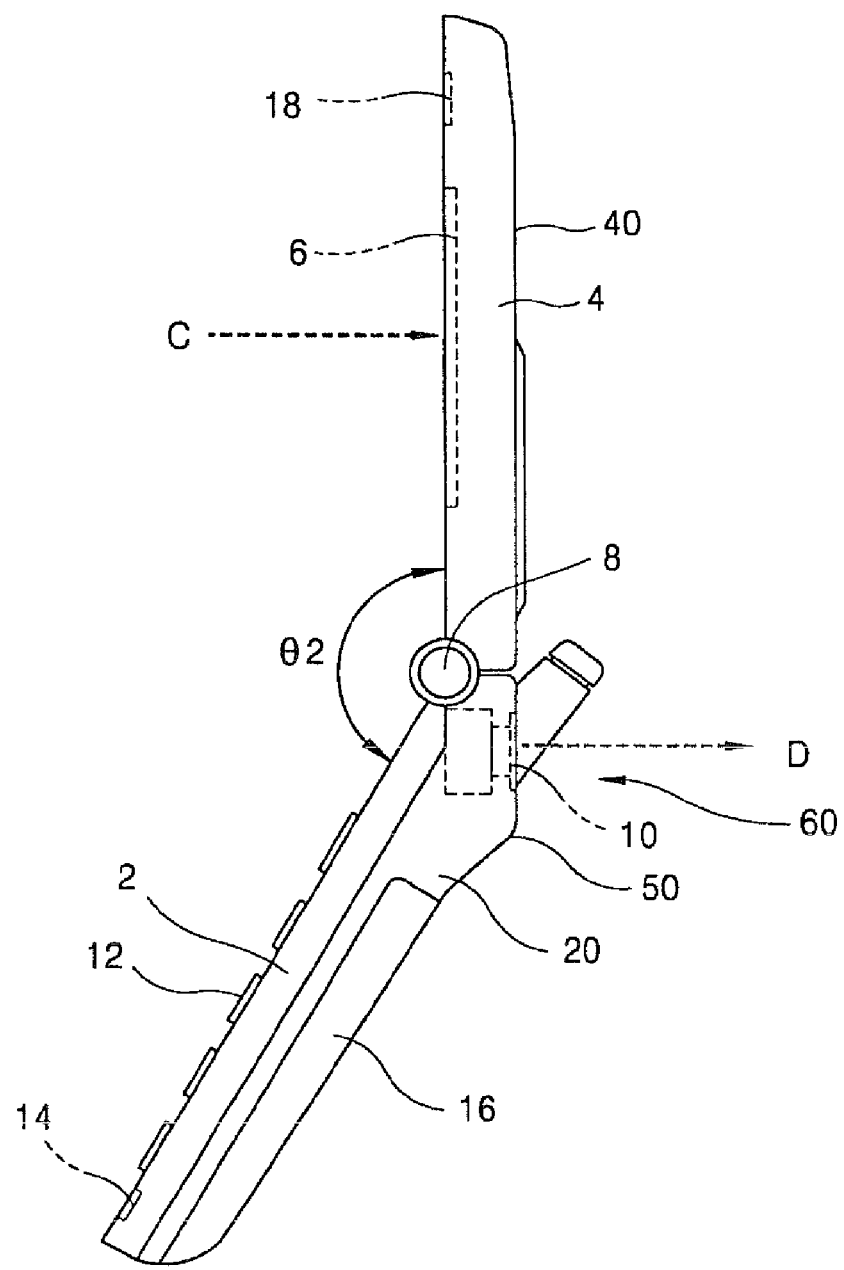
FIG. 4 is a side view of a mobile terminal with a camera, in accordance with one embodiment of the present invention, with the folder in an open state.
Figure 5:
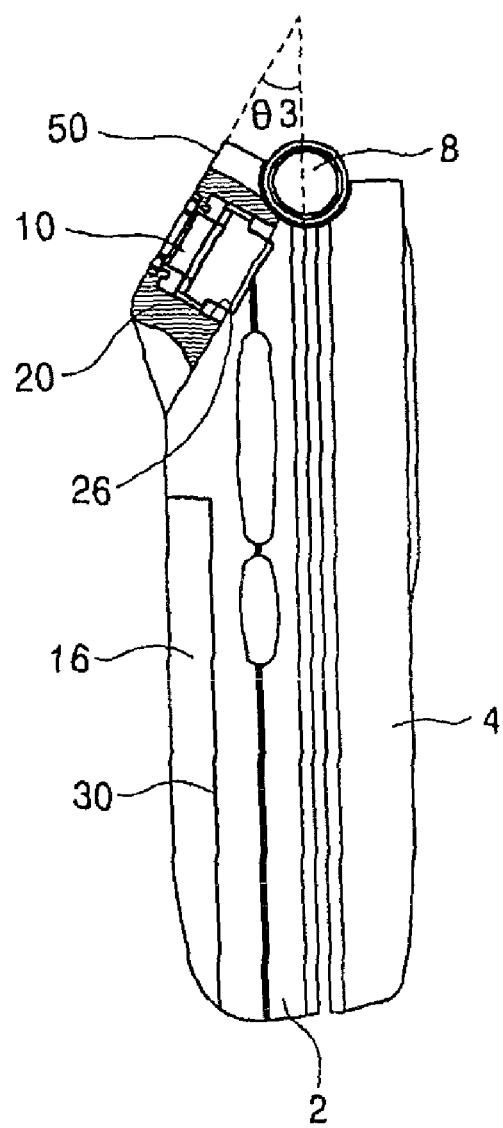
FIG. 5 is a side view of a mobile terminal with a camera, in accordance with one embodiment of the present invention, with the folder in a closed state.

FIG. 3 is a front view of a camera-attached type mobile terminal with a folder in an open state, in accordance with one embodiment of the present invention, and FIG. 4 is a side view of the camera-attached type mobile terminal shown in FIG. 3, with the folder in an open state. FIG. 5 is a side view of the mobile terminal shown in FIGS. 3 and 4, with the folder in a closed state.

The camera-attached type mobile terminal includes a main body 2, a folder 4 rotatably connected to the main body 2 and having a display 6 mounted thereon, a hinge connection part 8 foldably connecting the main body 2 and the folder 4, and a camera module 10 mounted at one side of the main body 2 for imaging a target.

The display 6 is suitably an LCD display, but can be implemented with any flat panel display, such as an electroluminescent or organic light-emitting diode display.

The main body 2 includes a main PCB (not shown), various menu buttons 12 formed at its front surface, a microphone 14 for transmitting a voice signal formed at a lower portion of its front surface, and a battery 16 mounted at its rear surface 30.

The folder 4 includes a speaker 18 for receiving a voice signal formed at an upper portion of its front surface. When the folder 4 is opened, an angle (θ2) between the folder 4 and the main body 2 is preferably maintained at approximately 150°.

The camera module 10 is mounted at an upper portion of the rear surface 30 of the main body 2 so that a direction (C) that a user looks toward to view the display 6 and an imaging direction (D) of the camera module 10 are substantially parallel. In a preferred embodiment, the imaging direction D of the camera module 10 generally corresponds to a direction that is substantially parallel to the bisector of the camera module's field of view. In a preferred embodiment, the direction C that a user looks toward to view the display 6 will generally correspond to a direction that is substantially orthogonal to a viewing surface of the display 6.

The camera module 10 is suitably an internal camera module which is inserted in the main body 2 or an external camera module which is detachably mounted on the main body 2. The camera module 10 may be a digital camera for photographing a target, or may be a video camera for taking a video of a target.

A protrusion 20 is preferably formed having a predetermined angle at an upper portion of the rear surface 30 of the main body 2, with a front surface 50 of the protrusion 20 positioned so that it is substantially level with a rear surface 40 of the folder 4 when the folder 4 is opened.

Specifically, the protrusion 20 preferably has a predetermined width at an upper portion of a rear side 60 of the main body 2 such that the normal to the front surface 50 of the protrusion 20 makes an angle of approximately 30° with respect to the normal to the rear surface of the main body 2. A camera module 10 and preferably a reflection mirror 24 are mounted at the front surface 50 of the protrusion 20.

As shown in FIG. 5, the camera module 10 is mounted at a mounting portion 26 formed at the protrusion 20 such that the angle between its imaging direction D and the front surface 50 of the protrusion 20 is approximately 90°. In one preferred embodiment, the reflection mirror 24 is mounted next to the camera module 10 and reflects an image of the user when the user images himself/herself.

The operation of the camera-attached type mobile terminal shown in FIGS. 3-5 will now be explained.

A user opens the folder 4. With the folder 4 standing upright in its open state, the user can record an image, either a still image or a video image depending on the type of camera, by manipulating the buttons 12 mounted on the main body 2, while viewing the display 6 mounted on the folder 4.

The imaging direction D of the camera module 10 and the direction that the user looks toward to view the display 6 form substantially parallel lines. Thus, the user can check and image a target accurately, and the imaging can be performed more conveniently.

Figure 6:
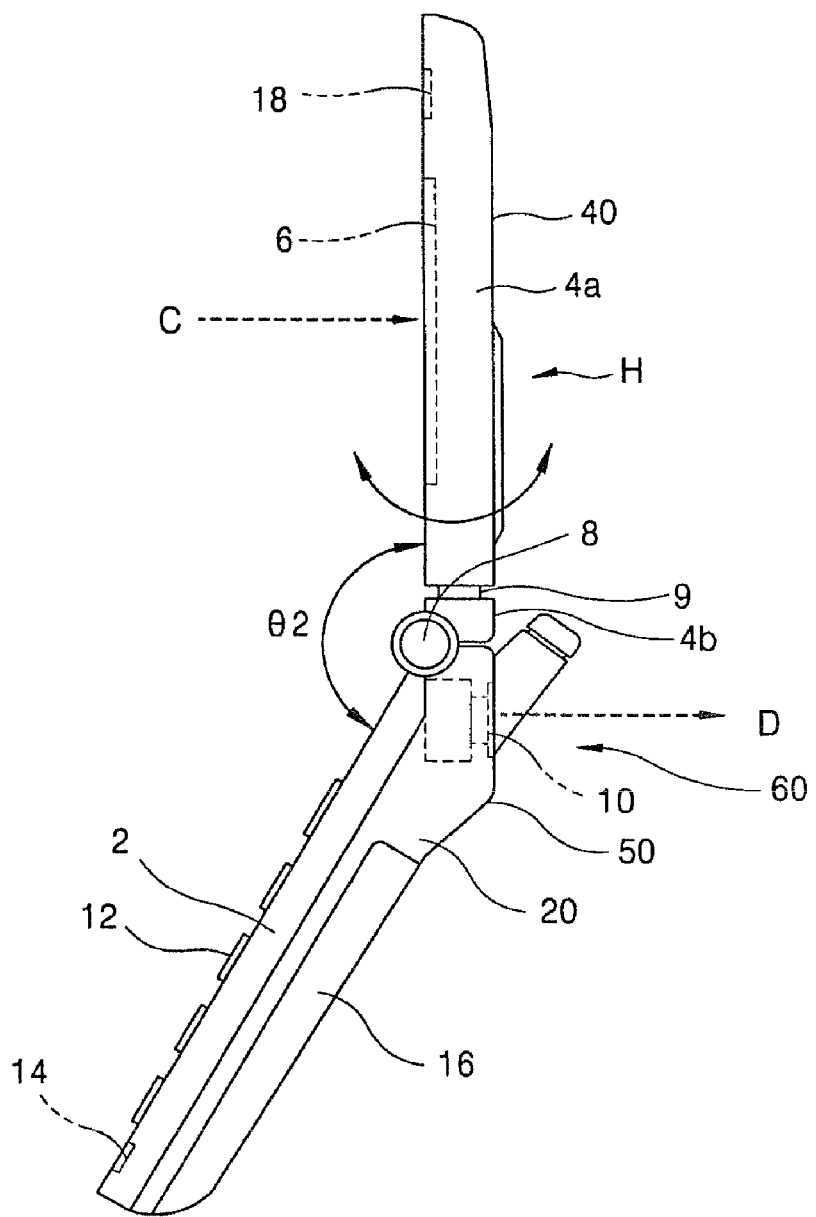
FIG. 6 is a side view of a mobile terminal with a camera in accordance with another embodiment of the present invention, with the folder in an open state.

FIG. 6 is a side view of a mobile terminal with a camera, in accordance with another embodiment of the present invention, with a folder in an open state. The embodiment of FIG. 6 is similar to the embodiments of FIGS. 3-5, except that the folder 4 is divided into a first folder portion 4A and a second folder portion 4B, with a hinge 9 rotatably connecting folder portion 4A with folder portion 4B.

The folder portion 4A is preferably rotatably connected to folder portion 4B with hinge 9 such that folder portion 4A is rotatable along a rotation axis that is orthogonal to a folding axis of hinge connection part 8, and such that it can be rotated by at least 180 degrees, and preferably 360 degrees, with respect to folder portion 4B. If folder portion 4A is rotated by 180 degrees from the position shown in FIG. 6, a user can view the display 6 while imaging himself/herself with camera module 10.

The camera-attached type mobile terminal of FIGS. 3-6 has at least the following advantages. Since the camera module 10 is installed at an upper portion of the rear side 60 of the main body 2 such that the direction that a user looks toward to view the display 6 and the camera imaging direction D form substantially parallel lines, the user can more accurately check and image or target while viewing the display 6, and the camera can be used more conveniently.

Figure 7:
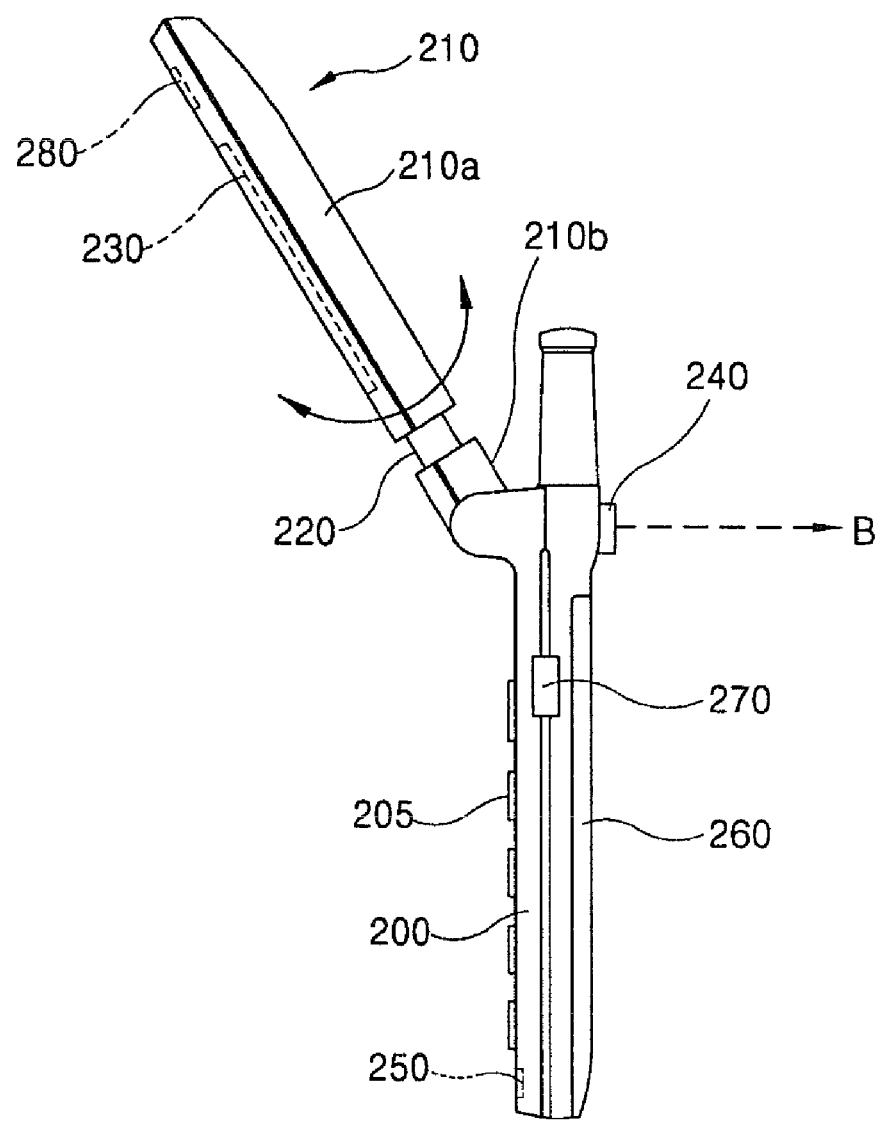
FIGS. 7-9 are side views of a mobile terminal with a camera, in accordance with another embodiment of the present invention.
Figure 8:
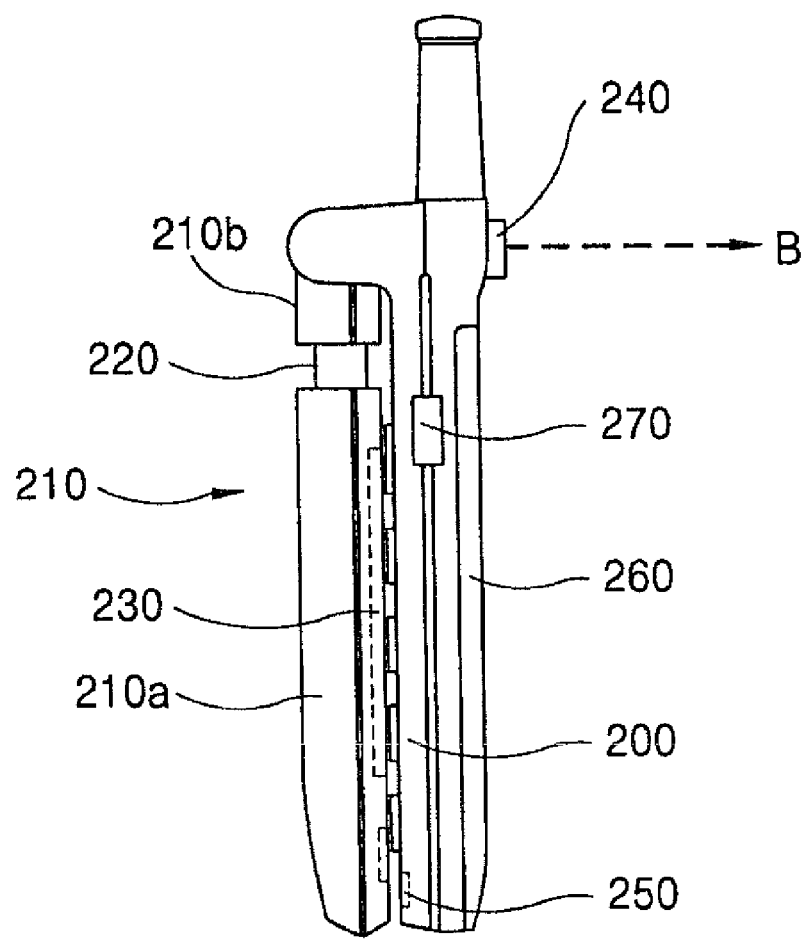
Figure 9:
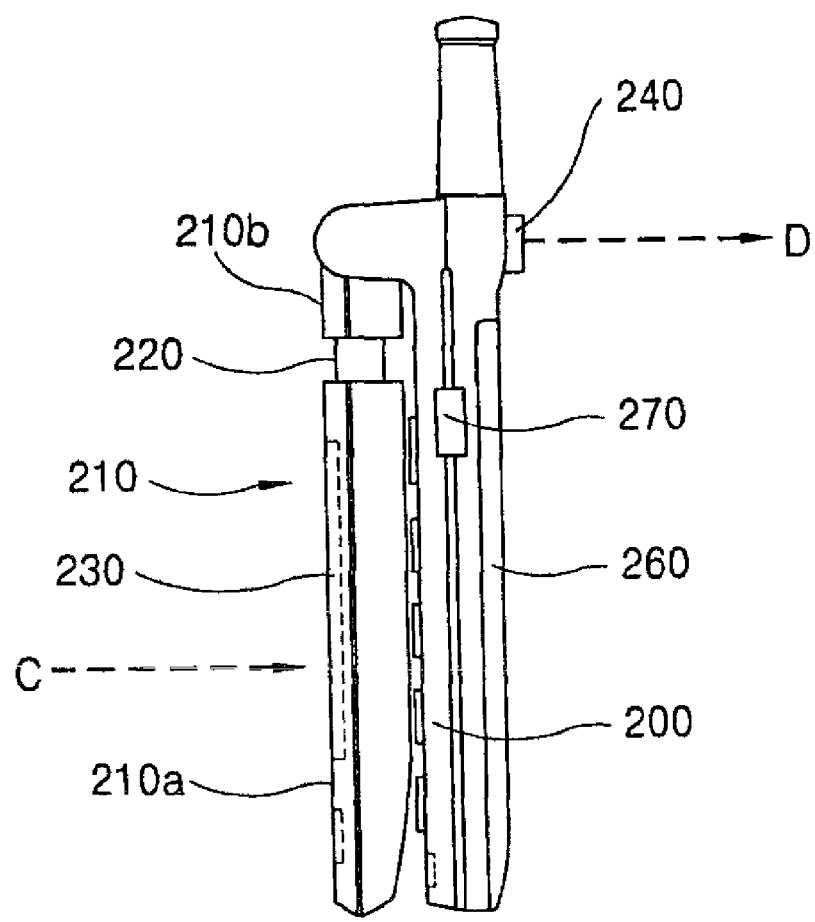

FIGS. 7-9 are side views of a mobile terminal with a camera, in accordance with another embodiment of the present invention. FIG. 7 shows the mobile terminal with a folder in an open configuration, FIG. 8 shows the mobile terminal with the folder in a first closed configuration, and FIG. 9 shows the mobile terminal with the folder in a second closed configuration.

The mobile terminal includes a main body 200 having menu buttons 205 formed at a front surface, a first folder 210 that includes a folder portion 210A rotatably connected to a second folder portion 210B with hinge 220, a hinge 230 that foldably connects folder portion 210B with the main body 200, a display 230 formed in the first folder portion 210A, and a camera module 240 mounted at a rear surface of the main body 200 for imaging a target. A microphone 250 is mounted at a lower portion of the main body 200 for receiving a voice signal, and a battery 260 is mounted at a rear surface with a main body 200. A camera control interface 270 is preferably mounted such that the camera module 240 may be operated when the folder 210 is in a closed configuration. The camera control interface 270 is suitably mounted at a side surface of the main body 200. A speaker 280 is mounted at an upper part of folder portion 210A.

The folder portion 210A is preferably rotatably mounted to folder portion 210B such that it rotates along a rotation axis that is orthogonal to a folding axis of hinge 230. Further, folder portion 210A is preferably rotatably mounted to folder portion 210B with hinge 220 such that folder portion 210A can be rotated by at least 180 degrees, and preferably 360 degrees, with respect to folder portion 210B. As shown in FIGS. 8 and 9, this allows for two closed configuration states.

In the closed configuration state shown in FIG. 8, folder portion 210A is rotated such that the display 230 is facing a front surface of the main body 200, such that the display 230 can not be viewed by a user. In the second closed configuration, shown in FIG. 9, folder portion 210A is rotated by 180 degrees with respect to the position shown in FIG. 8, such that the display 230 is viewable by a user.

In the second closed configuration shown in FIG. 9, a user can operate the camera module 240 using camera module control interface 270 to record an image of the target. In this configuration, a viewing direction C of the display 230 is substantially parallel to an imaging direction B of the camera module 240.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile terminal comprising:
   a first body having a first surface and a first hinge member; and
   a second body foldably connected to the first hinge member of the first body to allow an open configuration and a closed configuration,
   wherein the second body comprises:
      a connecting body connected to the first hinge member of the first body so as to be rotatable about a first axis, the connecting body protruding out from the first hinge member in a direction perpendicular to the first axis and being externally exposed when the mobile terminal is in the open configuration,
      a display body having a first surface and a second surface, the display body having a display on the first surface, and
      a second hinge member having a first end coupled to the display body and extending along a second axis to a second end coupled to the connecting body, the display body being rotatably coupled to the second hinge member such that the display body is rotatable about the second axis, wherein the closed configuration comprises:
         a first closed configuration in which the display on the first surface faces a front surface of the first body, and
         a second closed configuration in which the display on the first surface is outwardly exposed.

2. The mobile terminal of claim 1, wherein the first hinge member is provided at a central region of the display body.

3. The mobile terminal of claim 1, wherein the first axis is substantially perpendicular to the second axis.

4. The mobile terminal of claim 3, wherein the first axis is along a widthwise direction of the first body, and the second axis is along a lengthwise direction of the display body.

5. The mobile terminal of claim 1, wherein the display body is rotated by at least 180 degrees with respect to the connecting body.

6. The mobile terminal of claim 1, further comprising a camera provided on the first body.

7. The mobile terminal of claim 6, wherein the camera is mounted at a rear surface of the first body.

8. The mobile terminal of claim 6, wherein a viewing direction for the display and a capturing direction of the camera are substantially parallel to each other in the second closed configuration.

9. The mobile terminal of claim 6, further comprising a camera control interface to operate the camera.

10. The mobile terminal of claim 9, wherein the camera control interface is configured to be accessed in the closed configuration.

11. The mobile terminal of claim 9, wherein the camera control interface is positioned at a side surface of the first body.

12. The mobile terminal of claim 6, wherein a protrusion is formed at a rear surface of the first body, and the camera is provided in the protrusion such that a viewing direction for the display and a capturing direction of the camera are substantially parallel to each other in the open configuration.

13. The mobile terminal of claim 12, wherein the protrusion having a surface, and the viewing direction is substantially orthogonal to a viewing surface of the display, and the capturing direction of the camera is approximately 90 degrees from the surface of the protrusion.

14. The mobile terminal of claim 1, wherein the connecting body includes a flat first surface and a flat second surface, the flat first surface of the connecting body is on a same plane as the second surface of the display body and the flat second surface of the connecting body is on a same plane as the first surface of the display body when the mobile terminal is in the first closed configuration.

15. A mobile terminal comprising:
a main body having a camera on a rear surface, a front surface and a first hinge member that protrudes from the front surface;
a connecting body connected to the main body so as to be rotatable about a first axis;
a display body having a first surface and a second surface, the display body including a display on the first surface; and
a second hinge member extending from the connecting body along a second axis to the display body, the second hinge member having a first end coupled to the display body and a second end coupled to the connecting body, the display body being connected to the second hinge member such that the display body is rotatable about the second axis, and the display body is disposed to fold relative to the main body and to provide an open configuration and a closed configuration,
wherein the display on the first surface displays an image captured by the camera when the display is outwardly exposed in the closed configuration, wherein the display body is configured to fold to the front surface of the main body, and
wherein the connecting body protrudes out from the first hinge member in a direction other than along the first axis when the mobile terminal is in the open configuration.

16. The mobile terminal of claim 15, wherein the first axis is substantially perpendicular to the second axis.

17. The mobile terminal of claim 16, wherein the first axis is along a widthwise direction of the main body, and the second axis is along a lengthwise direction of the display body.

18. The mobile terminal of claim 15, wherein the display body is rotated by at least 180 degrees with respect to the connecting body.

19. The mobile terminal of claim 15, wherein a viewing direction for the display and an capturing direction of the camera are substantially parallel to each other when in the closed configuration.

20. The mobile terminal of claim 15, further comprising a camera control interface to operate the camera.

21. The mobile terminal of claim 20, wherein the camera control interface is configured to be accessed in the closed configuration.

22. The mobile terminal of claim 20, wherein the camera control interface is positioned at a side surface of the main body.

23. The mobile terminal of claim 15, wherein the connecting body includes a first top surface and a flat second surface, the first top surface of the connecting body is on a same plane as the second surface of the display body and the flat second surface of the connecting body is on a same plane as the first surface of the display body when the mobile terminal is in the first closed configuration.

24. A mobile terminal comprising:
a first body having a first surface and a second surface, and the first body includes a camera on the second surface and a first hinge member; and
a second body foldably connected to the first body to allow an open configuration, a first closed configuration and a second closed configuration,
wherein the second body comprises:
a connecting body connected to the first hinge member of the first body and being rotatable about a first axis, the connecting body protruding out from the first hinge member in a direction perpendicular to the first axis, the connecting body having a flat first surface and a flat second surface,
a display body having a first surface and a second surface, the display body having a display on the first surface of the display body, and
a second hinge member that extends from the connecting body along a second axis toward the display body, the second hinge member having a first end coupled to the display body and a second end coupled to the connecting body, the display body being connected to the second hinge member and is rotatable about the second axis,
wherein in the first closed configuration, the display on the first surface of the display body faces the first surface of the first body, and
in the second closed configuration, the display on the first surface of the display body is exposed away from the first body and the second surface of the display body faces the first surface of the first body, and
the first surface of the display body is planar with the flat first surface of the connecting body and the second surface of the display body is planar with the flat second surface of the connecting body when the mobile terminal is in the first closed configuration.

25. The mobile terminal of claim 24, wherein a viewing direction for the display and a capturing direction of the camera are substantially parallel to each other in the second closed configuration.

* * * * *

UNITED STATES PATENT AND TRADEMARK OFFICE
CERTIFICATE OF CORRECTION

PATENT NO. : 7,990,457 B2  
APPLICATION NO. : 12/125462  
DATED : August 2, 2011  
INVENTOR(S) : Yong-Hee Lee and Joon Jang Page 1 of 1

It is certified that error appears in the above-identified patent and that said Letters Patent is hereby corrected as shown below:

Title Page, please insert;

--Related U.S. Application Data
(62) Continuation of application No. 10/624,524, filed on July 23, 2003, now Pat. No. 7,414,656

(30) Foreign Application Priority Data
July 30, 2002 (KR) 10-2002-0045057--

Signed and Sealed this
Eighth Day of November, 2011

David J. Kappos
*Director of the United States Patent and Trademark Office*